United States Patent [19]

Bergman et al.

[11] Patent Number: 5,123,832
[45] Date of Patent: Jun. 23, 1992

[54] HOT ISOSTATIC PRESS

[75] Inventors: Carl Bergman, Västerås; Lars Ohlsson, Helsingborg, both of Sweden

[73] Assignee: Asea Brown Boveri AB, Västerås, Sweden

[21] Appl. No.: 766,919

[22] Filed: Sep. 27, 1991

Related U.S. Application Data

[63] Continuation of Ser. No. 598,750, Oct. 16, 1990, abandoned, which is a continuation-in-part of Ser. No. 370,785, Jun. 23, 1989, abandoned.

[30] Foreign Application Priority Data

Apr. 4, 1989 [SE] Sweden .................. 8901172

[51] Int. Cl.⁵ .......... B22F 3/14; B29C 43/10; F27D 7/00
[52] U.S. Cl. .................. 425/405.2; 219/400; 425/78; 425/143; 432/199; 432/205; 432/249
[58] Field of Search .......... 219/400; 266/252, 254; 419/49, 68; 425/73, 74, 78, 143, 405.2; 432/199, 205, 233, 249

[56] References Cited

U.S. PATENT DOCUMENTS

| | | | |
|---|---|---|---|
| 4,151,400 | 4/1979 | Smith, Jr. et al. | 425/405.2 |
| 4,217,087 | 8/1980 | Bowles | 425/405.2 |
| 4,235,592 | 11/1980 | Smith, Jr. et al. | 432/205 |
| 4,246,957 | 1/1981 | Smith, Jr. et al. | 165/61 |
| 4,349,333 | 9/1982 | Bowles | 432/205 |
| 4,509,729 | 4/1985 | Inoue | 425/405.2 |
| 4,532,984 | 8/1985 | Smith, Jr. | 432/205 |
| 4,602,769 | 7/1986 | Crum | 425/405.2 |
| 4,756,680 | 7/1988 | Ishii | 425/405.2 |

FOREIGN PATENT DOCUMENTS

| | | | |
|---|---|---|---|
| 133808 | 3/1985 | European Pat. Off. | 425/405.2 |
| 60-42589 | 3/1985 | Japan | 425/405.2 |
| 2098119 | 11/1982 | United Kingdom . | |

Primary Examiner—Jay H. Woo
Assistant Examiner—James P. Mackey
Attorney, Agent, or Firm—Watson, Cole, Grindle & Watson

[57] ABSTRACT

The invention relates to a device for cooling of the furnace chamber (4) in a hot isostatic press by means of devices (7, 8) for circulation of a coolant in the furnace chamber (4), the coolant having a temperature which is lower, but not considerably lower, than the temperature of the articles.

6 Claims, 1 Drawing Sheet

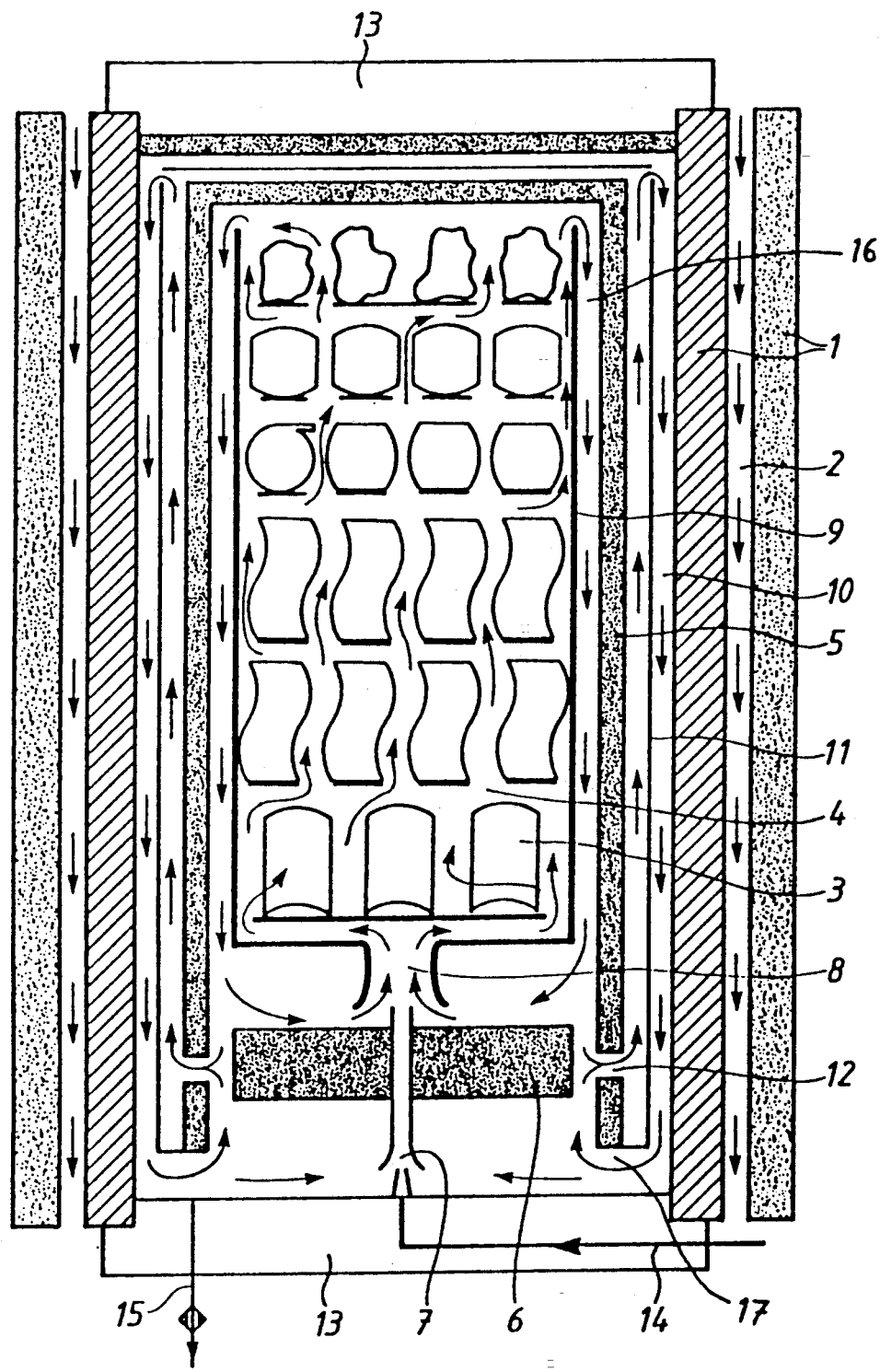

HOT ISOSTATIC PRESS

This application is a continuation, of application Ser. No. 598,750, filed Oct. 16, 1990, now abandoned, which is a continuation-in-part of application Ser. No. 370,785, filed Jun. 23, 1989, now abandoned.

BACKGROUND OF THE INVENTION

1. Technical Field of the Invention

The invention relates to the field of hot isostatic presses arranged for rapid cooling of articles by causing a cooled pressure medium to circulate through the furnace chamber.

2. Discussion of the Related Art

Hot isostatic presses are known in a variety of designs and utilized, for example, for manufacturing solid bodies starting from a powdered material, or for condensing castings. The press is able to operate within a wide temperature and pressure interval, usually between 500° and 2200° C. and between 500 and 2000 bar. As pressure medium an inert gas, such as argon, is usually used, but also liquid pressure mediums can be used.

The hot isostatic press substantially consists of a pressure chamber in which a furnace is arranged which is usually intended to be heated by means of electric heating elements and which is surrounded by a heat-insulating mantle and a bottom insulation plate. Between the heat-insulating mantle and the pressure vessel wall, which is usually provided with some form of cooling means, a space containing pressure medium is provided which is colder than the furnace chamber.

For many applications it is of interest to be able to rapidly cool the furnace chamber in order for the articles contained therein to attain the proper material properties, and also to make possible a more rapid withdrawal of the articles and thus reduce the cycle time.

To bring about a rapid cooling of the furnace chamber in a hot isostatic press, it is known to provide communication between the furnace chamber and the colder space in the press and allow cold gas from the colder part to circulate through the furnace chamber. It is also possible to effect additional cooling of the gas by allowing it to pass through a heat exchanger or some form of heat-absorbing body. Cooling can also be achieved by providing the press with a device for injecting cold gas from a source outside the press into the furnace chamber. Such a press is known from EP 85200706-1, in which the cooling is effected by allowing an injector, which is connected to a high pressure pipe for cold gas and is mounted inside a housing which communicates through a valve with the space between the chamber wall and the insulating mantle, to inject a mixture of cold gas into the furnace chamber. The insulating mantle around the furnace chamber is provided with openings so as to promote gas circulation.

The disadvantage of the present devices for effecting a rapid cooling of an HIP furnace is that a non-uniform cooling of the material is obtained when gas which is considerably colder than the gas in the furnace chamber flows through the articles. This may lead to an uneven quality of the articles. Also, stresses may arise in the articles which lead to the formation of cracks and result in the articles having to be rejected.

SUMMARY OF THE INVENTION

According to the invention there is provided, a hot isostatic press in which the load after treatment at elevated temperatures and pressures is subjected to rapid cooling.

Rapid cooling of pressed articles is required, for example, in the manufacture of Ni-base alloys. In order to impart suitable material properties to these alloys without demanding considerable heat treatment operations comprising heating and quenching after treatment in a hot isostatic press, it is a requirement that the articles can be rapidly cooled even when being located in the hot isostatic press. Ordinary treatment temperatures in a hot isostatic press are 1000°–1400° C., and from there the articles should be cooled down to about 600° C. at a rate of 40°–150° C./min.

The hot isostatic press comprises a pressure vessel in which is arranged a furnace chamber. The furnace chamber is surrounded by a heat insulating mantle and a heat insulating bottom plate. Between the heat insulating mantle and the pressure vessel a space is formed, in which the temperature is lower than in the furnace chamber and in which cooling of the pressure medium occurs due to contact with the pressure vessel wall. Below the bottom insulating plate there is also a space formed.

The heat insulating mantle is designed so that the mantle is sealed at the top and provided with openings in its lower part. The bottom insulating plate is not tightly connected to the insulating mantle. To obtain an optimum flow of pressure medium during the cooling phase, means for injecting pressure medium and means for guiding the flow of pressure medium are inserted in the press. The means are arranged in such a way that there is a flow of pressure medium through a loading space containing the articles to be cooled and a cooling loop of pressure medium in the space between the heat insulating mantle and the vessel wall. And in order to obtain a lower temperature of the pressure medium when it is entering the loading space and the cooling loop, a mixing of warm and cool pressure medium is arranged for.

The cooling flow of pressure medium through the loading space will have a temperature that is lower but not considerably lower than the temperature of the articles.

The desired temperature of the cooling flow is obtained by mixing pressure medium from the cooling loop with pressure medium from the furnace chamber before injection into the loading space. Also, the warm pressure medium from the furnace chamber entering the cooling loop is mixed with pressure medium from the cooling loop to lower the temperature of pressure medium entering the cooling loop.

The mixing of warm and cool pressure medium means that the temperature of the flow for cooling the articles is higher than used in the prior art for cooling of HIP-articles. Since the gas flow is large, a good heat transmission is obtained in spite of a small temperature difference between the cooling medium and the articles. There are many advantages with having a large cooling flow with a small temperature difference. The risks for uneven cooling and build-up of high inner tensions or cracks in the articles are considerable lowered by the invention. This means a higher yield and a higher quality of the products.

A means for guiding the flow is inserted in the furnace chamber around the loading space so that the flow of cooler pressure medium can enter the loading space from below and pass up through the loading space taking up heat from the articles. At the top of the furnace chamber, the heat insulating mantle is sealed and the flow is forced down along a gap that is formed between the guiding means around the loading space and the heat insulating mantle by the impact of the cooler pressure medium entering the furnace chamber from below.

In order that the pressure medium entering the furnace chamber during the cooling phase will have a proper temperature for cooling the articles, a means for injecting pressure medium is arranged at the lower end of the furnace in such a way that pressure medium which has been cooled by flowing through the space along the vessel wall is mixed with warm pressure medium that has been guided down along the gap formed between the insulating mantle and the guiding means around the loading space.

In order to better utilize the cooling capacity of the vessel wall and in order to avoid too high of a heat load on the wall, a second guiding means is inserted into a cooling loop in the space between the vessel wall and the insulating mantle. The second guiding means will guide the pressure medium entering into the cooling loop through the openings in the lower end of the heating insulating mantle to the top of the furnace without contact with the vessel wall so that a gradual cooling of the pressure medium will take place. Because of the radial thermal gradient, a convection occurs and the pressure medium flows upwards in the space between the guiding means and the heat insulating mantle. The second guiding means is provided with an open upper end so that the pressure medium when reaching the upper end can be guided to enter a space between the second guiding means and the vessel wall and flow down along the vessel wall to obtain an efficient cooling of the pressure medium is obtained. At the lower end of the furnace there is an opening so that pressure medium from the cooling loop can enter into the space below the bottom insulating plate. This opening is located below the openings in the heat insulating mantle so that a part of the flow of cooled pressure medium can reenter the cooling loop, thus lowering the temperature of the pressure medium entering the cooling loop in order to prevent damage to the second guiding means and the pressure vessel due to high heat loads. The injection of pressure medium into the loading space can be achieved by arranging a first pump means in the space below the bottom insulating plate. The first pump means pumps cooled pressure medium to a second pump means arranged above the bottom insulating plate. The second pump means is arranged for mixing cooled pressure medium from the first pump means with warm pressure medium being sucked up from the furnace chamber and injecting the mixture into the loading space. The temperature of the mixture being injected into the loading space can thus be regulated by altering the proportions of warm and respectively cooled pressure medium.

There is a balance between the amount of cooled pressure medium being mixed with warm pressure medium and injected in to the loading space and the amount of warm pressure medium being sucked into the cooling loop.

A hot isostatic press for rapid cooling, comprising means for injecting a large flow of cooling pressure medium through the loading space, the cooling pressure medium having a temperature which is lower but not considerably lower than the temperature of the articles, has many advantages.

The injection of cool pressure medium which is considerably cooler than the articles, such as pressure medium being led directly from the cooling loop by the vessel wall, may lead to uneven cooling of the articles resulting in a reduced yield.

By injecting the cooling flow from below, a very stable flow is obtained when the cooling flow is moving upwards to take heat from the articles. Internal heat currents in the cooling flow are avoided, resulting in an even cooling of the articles. By this a higher yeild and a better quality can be obtained.

BRIEF DESCRIPTION OF THE DRAWING

The accompanying single FIGURE shows a section through a hot isostatic press designed for rapid cooling of the articles.

DESCRIPTION OF THE PREFERRED EMBODIMENTS

The FIGURE shows a hot isostatic press operated with an inert gas such as argon as pressure medium and designed for rapid cooling of the articles at the end of an HIP cycle. The wall 1 of the pressure vessel are provided with means for water cooling 2. The top and bottom of the pressure chamber are provided with end closures 13. The bottom end closure 13 is provided with lead-through tubes 14, 15 for the supply and discharge of gas, respectively. The articles 3 are loaded in a loading space in the furnace chamber 4. This furnace chamber 14 is surrounded by a heat-insulating mantle 5 and a bottom insulating plate 6. The bottom insulating plate 6 is mounted separately at the bottom of the pressure chamber and is not tightly connected to the insulating mantle 5. A basket 9 is arranged in the furnace chamber 4 around the articles 3 in the loading space so that a gap 16 is formed between the basket 9 and heat insulating mantle 5. Two ejectors 7, 8 are arranged respectively below and above the bottom insulating plate 6. The lower ejector 7 is connected to a propellent gas system arranged outside the press.

The heat insulating mantle is provided with openings 12 in its lower part. Between the insulating mantle 5 and the vessel wall 1 a space 10 is formed. In the space 10 a sleeve 11 is inserted. The sleeve 11 is provided with an opening in its upper part and an open lower part 17. The open lower part is situated below the openings 12 in the heat insulating mantle.

The lower ejector 7 is arranged in a space below the bottom insulating plate 6 and is driven by a propellant gas flow. Gas from the cooling loop in the space 10 along the vessel wall is sucked in the cooling loop in the space 10 along the vessel wall is sucked in to the lower ejector 7. The lower ejector 7 provides the upper ejector 8 with its propellant flow. The upper ejector is arranged above the bottom insulating plate 6. In the upper injector 8 warm gas from the gap 16 is sucked into the ejector 8 and mixed with the propellant gas flow. This propellant gas flow mainly comprises cooled gas from the cooling loop. The resulting temperature of the gas injected into the loading space should be lower but not considerably lower than the temperature of the articles. The temperature of the injected gas is 5-30% lower than the temperature of the furnace chamber, a typical value being about 10% lower.

The upper ejector 8 is arranged below the loading space and the gas is injected from below. The gas take up heat from the articles and rise upwards. The small temperature difference between the articles and the cooling gas will lead to a stable flow moving upwards with very few internal movements, thus leading to an even cooling of the articles.

At the top of the loading space the heating insulating mantle 5 is sealed and the warm gas (which has taken up heat from the articles) is pressed down the gap 16 will by the injection of more cooling gas from below. A part of the warm gas at the bottom of the gap 16 will be sucked in by the ejector 8 and a part will be sucked into the cooling loop through the openings 12 in the insulating mantle. In order to avoid damages to the sleeve 11 and the vessel wall 1 from contact with the warm gas, a part of the cooled gas that is entering the space below the bottom insulating plate through the opening 17 below the openings 12 will be sucked into the cooling loop again together with the warm gas thus lowering the temperature of the gas entering the cooling loop.

There is a balance between the amount of cooled gas reentering the cooling loop and the amount of warm gas being reinjected into the loading space so that there are approximately equal amounts. In the cooling loop the gas will be directed by the sleeve 11 to circulate upwards without contact with the vessel wall and gradually cool along the way. At the top of the space 10 the sleeve has openings allowing the gas to pass over to the side of the sleeve where it gets in contact with the vessel wall and will circulate downwards while an efficient cooling takes place.

In the cooling loop the gas will be directed by the sleeve 11 to circulate upwards without contact with the vessel wall and gradually cool along the way. At the top of the space 10 the sleeve has openings allowing the gas to pass over to the other side of the sleeve where it gets in contact with the vessel wall and will circulate downwards while an efficient cooling takes place.

By designing a heat insulating mantle which is sealed at the top, a design is obtained which is considerably simpler than rapid cooling systems with openings in the upper part of the heat insulating mantle. Openings entail problems with sealing and lead to cold gas penetrating into the furnace chamber 4 during the HIP cycle. Another advantage of having a heat insulating mantle with an open bottom is that the pressure in the furnace chamber 4 is somewhat higher than in the space 10, which means that if a leakage should arise in the insulating mantle 5, no cold gas will flow into the furnace chamber 4 and cool parts of the articles. It is also possible to introduce in the outer loop, for cooling of the gas against the cylinder wall, an additional system for cooling such as heat exchangers or heat-absorbing bodies which are located in the gas flow.

The invention is also applicable to other combinations of pumps such as electrically or hydraulically driven pumps on motor-driven fans.

In another embodiment of a hot isostatic press according to the invention, the pressure medium is oil. Such a press can be used for the manufacture of explosives. A pump is provided at the bottom of the press. In a conduit, oil from the hot space of the furnace is mixed with cold oil which either comes from outside or which has been cooled inside the press. The hot oil is lead to the pump for mixing oil in a well insulated tube which extends through the heat insulation around the furnace and enables hot oil to be transported to the location of the pump. The mixed oil is then pressed up through the furnace chamber.

We claim:

1. A system for rapid cooling of articles in a hot isostatic press, said hot isostatic press comprising a pressure vessel, having a wall, a furnace chamber surrounded by a heat insulating mantle and a heat insulating bottom plate arranged in said pressure vessel, and a space formed between said heat insulating mantle and said pressure vessel wall, the system comprising:
   the heat insulating mantle being sealed at its top and provided with openings at two levels in its lower part so that pressure medium enters via the upper ones of said openings into a cooling loop in the space between the mantle and the vessel wall, and via the lower ones of said openings goes from the cooling loop into a space below the heat insulating bottom plate;
   the heat insulating bottom plate being mounted separately from the insulating mantle so that there is an opening between the heat insulating mantle and the insulating bottom plate;
   a space between the heat insulating bottom plate and a bottom end closure of the pressure vessel;
   a first guiding means for guiding pressure medium surrounding a loading space in the furnace chamber, said first guiding means having an opening in its upper part and an opening in its lower part and being arranged so that a gap is formed between said first guiding means and the heat insulating mantle so that a flow of pressure medium in the upward direction through the loading space, when reaching the sealed heat insulating mantle, is guided down along said gap;
   a second guiding means for guiding the pressure medium circulation in the cooling loop, so that the pressure medium circulates in the upward direction without contact with the vessel wall and in the downward direction in contact with the vessel wall;
   said second guiding means having an open upper part so that the pressure medium is guided to enter a space between the second guiding means and the vessel wall and a lower end that is connected to a lower end of the heat insulating mantle and arranged so that the pressure medium coming from the space between the second guiding means and the vessel wall enters into the space between the heat insulating bottom plate and the bottom end closure, whereby a part of the cooled pressure medium reenters the cooling loop via the upper ones of the openings in the heat insulating mantle; and
   a first pump means and a second pump means, said first pump means for pumping cooled pressure medium upwards from the space between the bottom insulating plate and the bottom end closure to said second pump means, said second pump means for pumping a mixture of cooled pressure medium and warm pressure medium from the gap between the first guiding means and the insulating mantle upwards through the loading space, said mixture having a temperature that is lower than the temperature of the articles.

2. A system according to claim 1, in which the pressure medium is an inert gas.

3. A system according to claim 2, in which said first pump means comprises a first jet pump connected to a propellent gas supply arranged outside the press, and said second pump means comprising a second jet pump, said second jet pump having a propellent gas flow which comprises gas from said first jet pump.

4. A system according to claim 1, in which said first pump means comprises an electrically driven fan and said second pump means is selected from the group consisting of a jet pump, an electrically driven pump, a hydraulically driven pump, and an electrically driven fan.

5. A system for rapid cooling of articles in a hot isostatic press, said hot isostatic press comprising a pressure vessel, having a wall, a furnace chamber surrounded by a heat insulating mantle and a heat insulating bottom plate arranged in said pressure vessel, and a space formed between said heat insulating mantle and said pressure vessel wall, the system comprising:

the heat insulating mantle being sealed at its top and provided with openings at two levels in its lower part so that pressure medium enters via the upper ones of said openings into a cooling loop in the space between the mantle and the vessel wall, and via the lower ones of said openings goes from the cooling loop into a space below the heat insulating bottom plate;

the heat insulating bottom plate being mounted separately from the insulating mantle so that there is an opening between the heat insulating mantle and the insulating bottom plate;

a space between the heat insulating bottom plate and a bottom end closure of the pressure vessel;

a first guiding means for guiding pressure medium surrounding a loading space in the furnace chamber, said first guiding means having an opening in its upper part and an opening in its lower part and being arranged so that a gap is formed between said first guiding means and the heat insulating mantle so that a flow of pressure medium in the upward direction through the loading space, when reaching the sealed heat insulating mantle, is guided down along said gap;

a second guiding means for guiding the pressure medium circulation in the cooling loop, so that the pressure medium circulates in the upward direction without contact with the vessel wall and in the downward direction in contact with the vessel wall;

said second guiding means having an open upper part so that the pressure medium is guided to enter a space between the second guiding means and the vessel wall and a lower end that is connected to a lower end of the heat insulating mantle and arranged so that the pressure medium coming from the space between the second guiding means and the vessel wall enters into the space between the heat insulating bottom plate and the bottom end closure, whereby a part of the cooled pressure medium reenters the cooling loop via the upper ones of the openings in the heat insulating mantle; and a first pump means and a second pump means, said first pump means for pumping cooled pressure medium upwards from the space between the bottom insulating plate and the bottom end closure to said second pump means, said second pump means for pumping a mixture of cooled pressure medium and warm pressure medium from the gap between the first guiding means and the insulating mantle upwards through the loading space, said mixture having a temperature that is 5–30% lower than the temperature of the articles.

6. A system for rapid cooling of articles in a hot isostatic press, said hot isostatic press comprising a pressure vessel, having a wall, a furnace chamber surrounded by a heat insulating mantle and a heat insulating bottom plate arranged in said pressure vessel, and a space formed between said heat insulating mantle and said pressure vessel wall, the system comprising:

the heat insulating mantle being sealed at its top and provided with openings at two levels in its lower part so that pressure medium enters via the upper ones of said openings into a cooling loop in the space between the mantle and the vessel wall, and via the lower ones of said openings goes from the cooling loop into a space below the heat insulating bottom plate;

the heat insulating bottom plate being mounted separately from the insulating mantle so that there is an opening between the heat insulating mantle and the insulating bottom plate;

a space between the heat insulating bottom plate and a bottom end closure of the pressure vessel;

a first guiding means for guiding pressure medium surrounding a loading space in the furnace chamber, said first guiding means having an opening in its upper part and an opening in its lower part and being arranged so that a gap is formed between said first guiding means and the heat insulating mantle so that a flow of pressure medium in the upward direction through the loading space, when reaching the sealed heat insulating mantle, is guided down along said gap;

a second guiding means for guiding the pressure medium circulation in the cooling loop, so that the pressure medium circulates in the upward direction without contact with the vessel wall and in the downward direction in contact with the vessel wall;

said second guiding means having an open upper part so that the pressure medium is guided to enter a space between the second guiding means and the vessel wall and a lower end that is connected to a lower end of the heat insulating mantle and arranged so that the pressure medium coming from the space between the second guiding means and the vessel wall enters into the space between the heat insulating bottom plate and the bottom end closure, whereby a part of the cooled pressure medium reenters the cooling loop via the upper ones of the openings in the heat insulating mantle; and a first pump means and a second pump means, said first pump means for pumping cooled pressure medium upwards from the space between the bottom insulating plate and the bottom end closure to said second pump means, said second pump means for pumping a mixture of cooled pressure medium and warm pressure medium from the gap between the first guiding means and the insulating mantle upwards through the loading space, said mixture having a temperature that is about 10% lower than the temperature of the articles.

* * * * *